United States Patent
Chen et al.

(10) Patent No.: US 8,355,012 B2
(45) Date of Patent: Jan. 15, 2013

(54) SCANNING METHOD FOR DETERMINING A TOUCH POSITION OF A TOUCH INPUT APPARATUS

(75) Inventors: Wei-Chou Chen, Hsin-Chu (TW); Chung-Wen Hsu, Kaohsiung (TW)

(73) Assignee: Waltop International Corporation, Hsinchu (TW)

( * ) Notice: Subject to any disclaimer, the term of this patent is extended or adjusted under 35 U.S.C. 154(b) by 263 days.

(21) Appl. No.: 12/916,928

(22) Filed: Nov. 1, 2010

(65) Prior Publication Data

US 2011/0279412 A1    Nov. 17, 2011

(30) Foreign Application Priority Data

May 13, 2010 (TW) ................................ 99115333 A

(51) Int. Cl.
*G06F 3/042* (2006.01)
(52) U.S. Cl. ........................................................ 345/175
(58) Field of Classification Search ................... 345/175
See application file for complete search history.

(56) References Cited

U.S. PATENT DOCUMENTS

| | | | |
|---|---|---|---|
| 8,009,152 B2 * | 8/2011 | Kim et al. ...................... | 345/175 |
| 2010/0066704 A1 * | 3/2010 | Kasai ............................ | 345/175 |

* cited by examiner

*Primary Examiner* — Kevin M Nguyen
(74) *Attorney, Agent, or Firm* — Muncy, Geissler, Olds & Lowe, PLLC

(57) ABSTRACT

A scanning method for determining the touch position of a touch input apparatus is disclosed. First of all, a first exposure process on light sensors of the touch input apparatus by light emitting device of the touch input apparatus is performed. Then the light sensors are scanned. A light sensor generating a signal with a maximum value is located. A region of partial scan of the light sensors is determined according to the position of the light sensor generating the signal with the maximum value. A second exposure process is performed on the light sensors. Then the light sensors within the region of partial scan are scanned. A light sensor generating a signal with a maximum value within the region of partial scan is located and a next region of partial scan is determined. The maximum value of the signal is calculated and the maximum value of the signal is compared to a predetermined value to determine whether the maximum value is higher than the predetermined value.

10 Claims, 4 Drawing Sheets

SCANNING METHOD FOR DETERMINING A TOUCH POSITION OF A TOUCH INPUT APPARATUS

FIELD OF THE INVENTION

The present invention relates to a scanning method for determining a touch position of a touch input apparatus, and more particularly to a scanning method for determining a touch position of a touch input apparatus which can improve the efficiency and shorten the reaction time.

DESCRIPTION OF THE PRIOR ART

Apparatuses which apply touch technologies to input instruction or information such as displays with touch function can accurately locate the coordinates of touch points within effective sensing range. Among various techniques of detecting the coordinates of touch points on the surface of a display, one technique of detecting the coordinate of a touch point is to locate the light emitting module and the light sensor module on opposing sides of a display respectively. The position of the touch point is detected by the position of the sensor of the light sensor module which does not receive light emitted from the corresponding the light emitter of the light emitting module. That is, the location of the touch point is determined by the blocking of light by the pointer such as an user' finger or a pen. Such technique of detecting the coordinate of a touch point is widely applied upon apparatuses with a large sensing area, and the resolution depends on the number or density of the light emitters and the sensors of the light emitting module and the light sensor module respectively. Moreover, the signal processing would be more complicated if more light emitters and sensors are used to obtain a higher resolution beside the higher cost of devices.

Another technique is to place both light emitting modules and light sensor modules at corners of the screen of the display. When a pointer such as user's finger, a pen or other object contacts or approaches the screen of the display, light emitted from the light emitting modules will be partially reflected back to the sensors of the light sensor modules. The relative angles between the location of the touch point and the positions of the sensors receiving the reflected light can be used to determine the coordinate of the touch point of the pointer through the principles of geometry and trigonometry. The advantages of this technique of detecting the coordinates of touch point include obtaining enough resolution or accuracy with fewer devices, etc. However, this technique of detecting the coordinates of touch point also has disadvantages including lower the response rate or longer the reaction time. Since the detection of the touch point is performed via scanning all sensors to detect the variation of light sensing signals and the touch point usually moves continuously rather than rapidly jumping among widely area, the response speed will be lower if all sensors are continuously and repeatedly scanned to detect the location of the touch point.

In order to solve the above-mentioned drawbacks of the conventional scanning method for determining a touch position of a touch input, a new scanning method for determining a touch position of a touch input apparatus is thus provided to improve the scan efficiency to rapidly locate the touch positions.

SUMMARY OF THE INVENTION

An object of the present invention is to provide a scanning method for determining a touch position of a touch input apparatus to speed up the scanning efficiency and to improve the response time of the touch input apparatus by replacing unnecessary full scans with partial scans.

The scanning method for determining a touch position of a touch input apparatus of the invention includes full-scan and partial-scan portions performed via the internal firmware programmed in the control module. For the conventional method, the response rate is limited to the number of the sensors because it scanning all sensors to detect the variation of light sensing signals. The invention check the light sensors received signals with maximum values in the full scan period and performs the partial scan period only in the locations of the light sensors received signals with maximum values. The partial scan period is performed on a region including the light sensors received signals with maximum values. That is to say, it only scans the maximum signal light sensor and its three or four adjacent sensors. When the pointer moves the partial scan portion will change according to the locations of the light sensors generating signals with maximum values. Since only scanning maximum-signal sensor and its adjacent light sensors, the response time of the touch input apparatus can be upgraded.

According to the object, one embodiment of the present invention provides a scanning method for determining a touch position of a pointer on a touch input apparatus. The method comprises the following steps. First of all, a touch input apparatus with at least one light emitting device and at least one light receiving device having a plurality of light sensors is provided. Next a first exposure process on the light receiving device by the light emitting device is performed. Then all the light sensors of the light receiving device are scanned. Next only one light sensor generating the maximum signal is located. Then a region of partial scan of the light sensors is determined according to the position of the light sensor generating the maximum signal. Next a second exposure process is performed on the light receiving device by the light emitting device. Then only the light sensors within the partial-scan-region are scanned. Next a light sensor generating a signal with a maximum value within the region of partial scan is located and a next region of partial scan is determined. Then the maximum value of the signal is calculated. Finally, the maximum value of the signal is compared to a predetermined value to determine whether the maximum value is higher than the predetermined value.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

DESCRIPTION OF THE PREFERRED EMBODIMENT

The detailed description of the present invention will be discussed in the following embodiments, which are not intended to limit the scope of the present invention, but can be adapted for other applications. While drawings are illustrated in details, it is appreciated that the scale of each component may not be expressly exactly.

Figure 1:
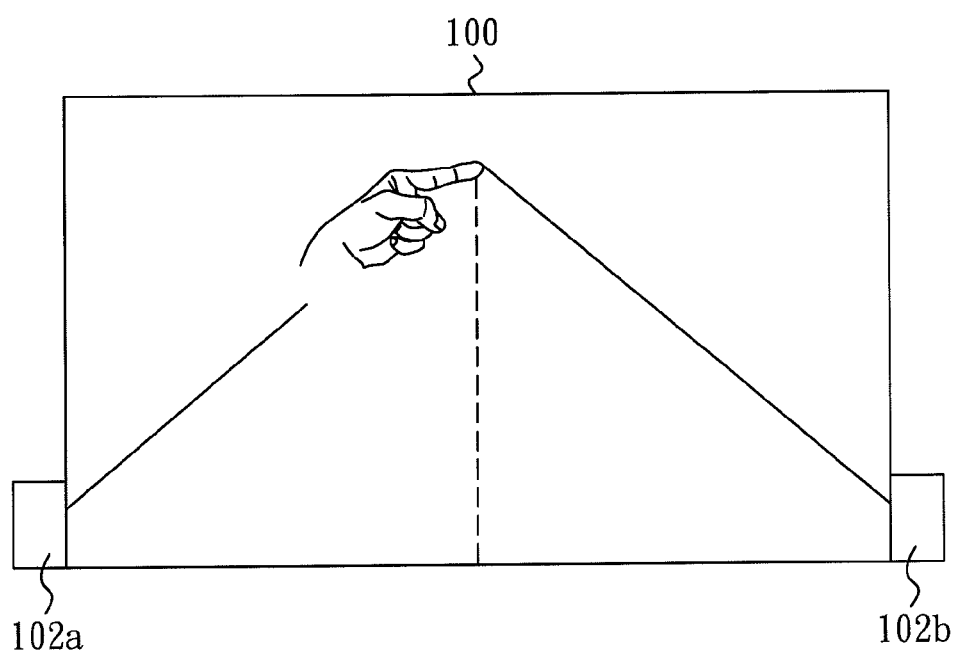
FIG. 1 shows a schematic diagram of a touch input apparatus according to one embodiment of the invention.

FIG. 1 shows a schematic diagram of a touch input apparatus according to one embodiment of the invention. The location of a pointer or indicator in a sensing area 100 such as a user's finger or a stylus or a pen is determined through the reflection and detection of light emitted from and received by the light emitting and receiving modules 102a and 102b located at the corners of the sensing area 100. When the pointer or indicator such as a user's finger or a stylus approaches the sensing area 100, the lights emitted from the light emitting and receiving modules 102a and 102b toward the pointer are blocked and reflected back to the light emitting and receiving modules 102a and 102b to receive signals with maximum values so as to determine the relative angle between the location of the pointer and the light emitting and receiving modules 102a and 102b. The coordinates of the pointer can be calculated through the principles of geometry and trigonometry by using the relative angle between the location of the pointer and the light emitting and receiving modules 102a and 102b, and the distance between the light emitting and receiving modules 102a and 102b. Since the lights which are not blocked by the pointer are not reflected, sensors or light detectors of the light emitting and receiving modules 102a and 102b will not receive reflected lights or only receive weak lights to generate negligible signals. Hence those sensors or light detectors of the light emitting and receiving modules 102a and 102b which generate signals with maximum values are identified. Therefore, the position of the pointer in the sensing area 100 can be located through the variations of the signals from the light emitting and receiving modules 102a and 102b and the principles of geometry and trigonometry. It is noted that the touch input apparatus shown in FIG. 1 is a schematic configuration only, and thus those features which are not crucial for one with ordinary skill in the art to make and use the invention are omitted. For example, the light emitting and receiving modules 102a and 102b are not limited to be located at the lower positions (corners). Those features of the touch input apparatus of the embodiment which are omitted can be practiced via any well-known prior art, and one with ordinary skill in the art can make and use the invention based on ordinary level of skill. The sensing area 100 of the touch input apparatus comprises, but not limited to sensing areas of touch panels, electronic white boards. It will be appreciated by those skilled in the art that various modifications or alternatives may be made without departing from the scope of the present invention, which is intended to be limited solely by the appended claims. The touch panel comprises a flat panel display including liquid crystal displays, plasma displays and rear projection displays, etc, but cathode ray tube displays are not excluded. The light emitting and receiving modules 102a and 102b comprise light emitting devices, light receiving devices and other well-known components. The light emitting device comprises, but not limited to an infrared laser emitting device. The infrared laser emitting device can transform a spot light source to a line light source by using focusing lens and wave-shaped lens to emit light into the sensing area 100. The light receiving device comprises light sensors including charge coupled devices (CCD) or complementary metal oxide semiconductor (CMOS) devices and lens components. It will be appreciated by those skilled in the art that various modifications or alternatives of the embodiment may be made without departing from the scope of the present invention, which is intended to be limited solely by the appended claims.

Figure 2:
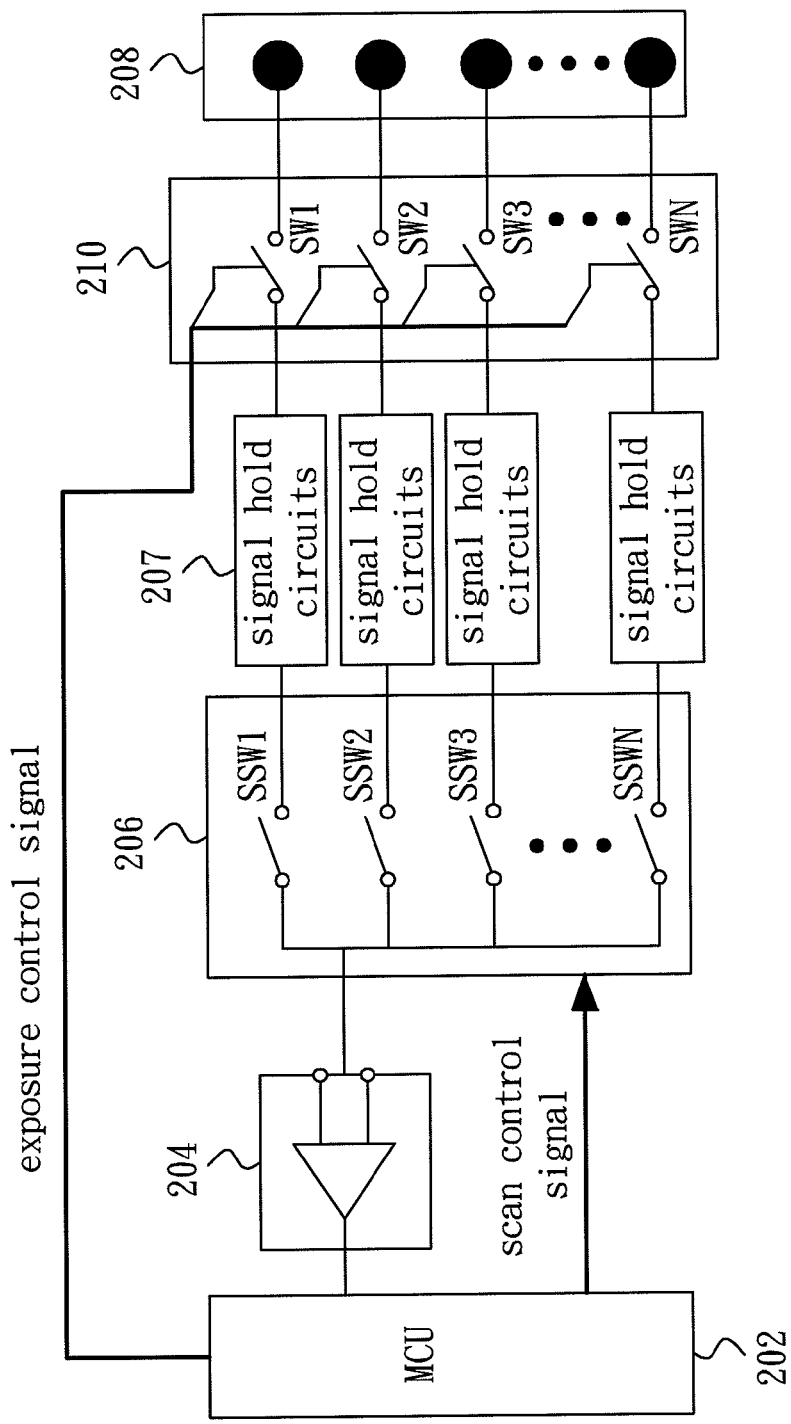
FIG. 2 shows a block diagram of a touch input apparatus according to one embodiment of the invention.

FIG. 2 shows a block diagram of a touch input apparatus according to one embodiment of the invention. The block diagram merely disclose light receiving devices of the light emitting and receiving modules and related scan control portions without showing a complete light emitting and receiving modules. The light emitting devices of the light emitting and receiving modules are omitted. The detail features of light emitting and receiving modules are well-known and can be practiced via related techniques by any ordinary skilled in the art. Any one with ordinary skill in the art can make and use the invention based on ordinary level of skill. As shown in FIG. 1 and the description mentioned above, the light emitting device comprises an infrared laser emitting device in one embodiment. The infrared laser emitting device can transform a spot light source to a line light source by using focusing lens and wave-shaped lens to emit light into the sensing area. The light receiving device detects the infrared laser reflected from the pointer through lens components and light sensors located behind the lens components in a linear arrangement. The light sensors of the light receiving device 208 are in a linear arrangement. A control module 202 controls whether signals received by the light sensors of the light receiving device 208 are transmitted to corresponding signal hold circuits 207 through switches (SW1~SWN) of an exposure control switch module 210. The control module 202 controls whether signals held by the signal hold circuits 207 are transmitted to an amplifying and processing circuit 204 through switches (SSW1~SSWN) of a scan control switch module 206. The signals amplified and processed by the amplifying and processing circuit 204 are transmitted to the control module 202. The control module 202 comprises, but not limited to a micro controller unit (MCU). Each light sensor of the light receiving device 208 corresponds to each switch of the exposure control switch module 210. The exposure mode of the light sensors are controlled by exposure control signals from the control module 202 according to firmware program thereof. Each light sensor of the light receiving device 208 corresponds to the respective signal hold circuit 207. Each signal hold circuit 207 corresponds to each switch of the scan control switch module 206. The scan mode of the light sensors and the signal hold circuit 207 are controlled by scan control signals from the control module 202 according to firmware program thereof.

The switches of the exposure control switch module 210 receive the exposure control signals from the control module 202 to turn on the corresponding light sensors to receive the lights emitted from the light emitting devices and reflected back from the pointer such as the user's finger. The light sensors generate and transmit signals to the signal hold circuit 207 after receiving the lights. The control module 202 transmits scan control signals to the scan control switch module 206 to determine the scan mode of the signal hold circuits 207 or the light sensors. The signal hold circuits 207 connect with the switches of the scan control switch module 206 which are turned on transmit signals to the amplifying and processing circuit 204. The amplifying and processing circuit 204 processes and transmits the signals to the control module 202 and control module 202 calculates coordinates of the pointer in the sensing area. The algorithm programs of geometry and trigonometry of the control module 202 can be practiced via any well-known prior art, and one with ordinary skill in the art can make and use the invention based on ordinary level of skill.

In order to detect whether there is a pointer present in the sensing area of a touch input apparatus, the control module must control the light emitting and receiving modules to emit light and the exposure control switch module to control the light sensors to receive the lights reflected back from the pointer such as the user's finger to calculate coordinates of the pointer in the sensing area. The control module sequentially turns on the switches of the exposure control switch module to exposing all light sensors. The signals generated by the light sensors are then transmitted to the signal hold circuits and all signals generated and received can be processed. Then the control module sequentially turns on the switches of the scan control switch module 206 to scan all signal hold circuits or light sensors and all signals generated and received can be processed. If the pointer is present in the sensing area of the touch input apparatus, the position of the pointer can be roughly determined through the locations of the light sensors generating signals with maximum values. The control module sequentially turns on the switches to perform a partial scan on the region around the light sensors generating signals with maximum values according the locations of the light sensors generating signals with maximum values. The partial scan is performed by turning on the switches corresponding to the light sensors adjacent the light sensors generating signals with maximum values. The position of the pointer is verified if the signals with maximum values are received again and the coordinates of the pointer are calculated via further signal processing.

Figure 3:
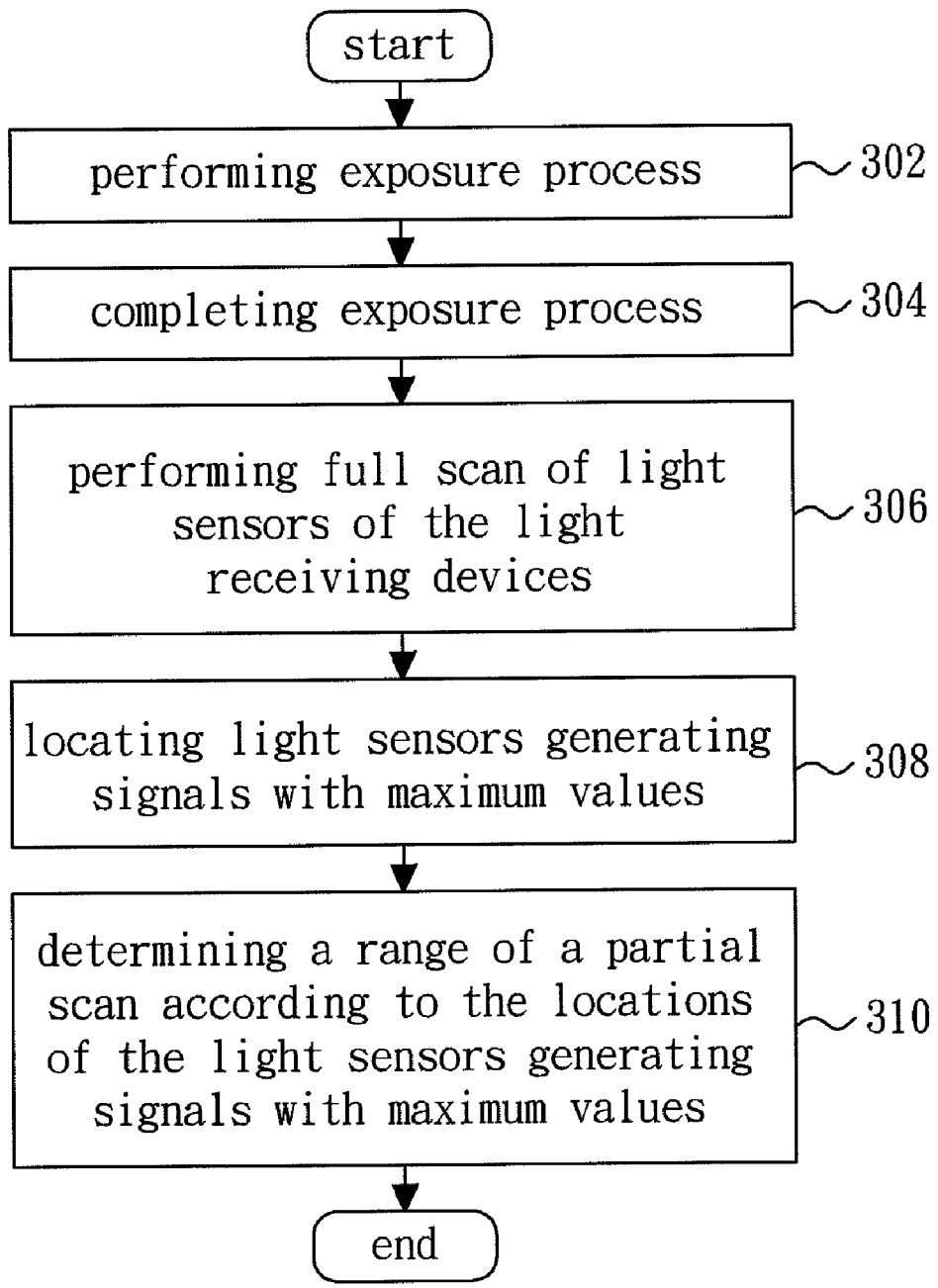
FIG. 3 shows a flow chart of a full scan portion of the scanning method for determining a touch position of a touch input apparatus according to one embodiment of the invention.

FIG. 3 shows a flow chart of a full scan portion of the scanning method for determining a touch position of a touch input apparatus according to one embodiment of the invention. First of all, light emitting devices of the touch input apparatus emit lights to a pointer and receiving devices of the touch input apparatus receive the lights reflected from the pointer to perform an exposure process in step 302. The exposure process is completed in step 304. A full scan of light sensors of the light receiving devices is performed in step 306. Then light sensors generating signals with maximum values are located in step 308. Finally, a range of a partial scan is determined according to the locations of the light sensors generating signals with maximum values in step 310. The full scan of light sensors in step 306 comprises a sequential scan, divisional scans and alternating scans of all light sensors. The sequential scan of all light sensors is performed by scanning each light sensor sequentially to receive the lights and locate the light sensor generating signals with maximum values. The divisional scans are performed by scanning one representative light sensor of the light sensors within each division, wherein the sensing area is divided in to multiple divisions. If the value of the signal generated from the representative light sensor of a division is over a predetermined value, the light sensor generating signals with maximum values are determined in this division, and a partial scan is then performed. If the values of the signals generated from two representative light sensors of two adjacent divisions are over a predetermined value, the values of the signals generated from two representative light sensors are then compared to determine in which division the light sensors generating signals with maximum values are located. The alternating scans are performed by scanning every three or four adjacent light sensors. If the value of the signal generated from any one of the adjacent light sensors is over a predetermined value, the light sensor generating signals with maximum values are located in these three or four light sensors, and a partial scan is then performed. If the values of the signals generated from two light sensors located by two alternating scans are over a predetermined value, the values of the signals generated determined by two alternating scans are then compared to determine the locations of the light sensor generating signals with maximum values.

Figure 4:
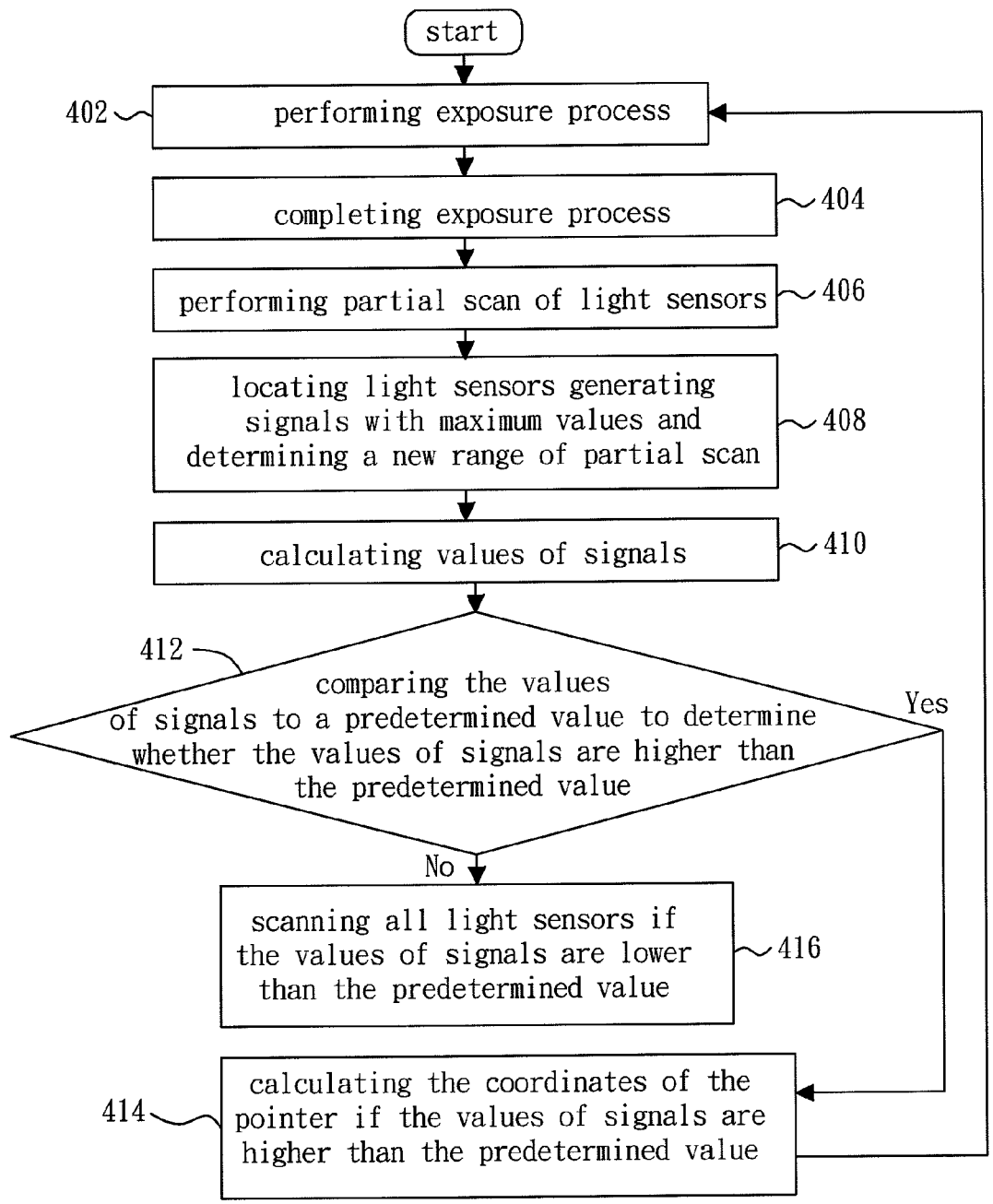
FIG. 4 shows a flow chart of a partial scan portion of the scanning method for determining a touch position of a touch input apparatus according to one embodiment of the invention.

FIG. 4 shows a flow chart of a partial scan portion of the scanning method for determining a touch position of a touch input apparatus according to one embodiment of the invention. First of all, the light emitting devices in the range of a partial scan determined by the full scan emit lights to the pointer and the receiving devices in the range of a partial scan receive the lights reflected from the pointer to perform an exposure process in step 402. The exposure process is completed in step 404. A partial scan of light sensors is performed in step 406. Then light sensors generating signals with maximum values are located and a new range of partial scan is determined in step 408. Next values of signals are calculated in step 410. Then the values of signals are compared to a predetermined value to determine whether the values of signals are higher than the predetermined value in step 412. Next the coordinates of the pointer are calculated if the values of signals are higher than the predetermined value in step 414, and the steps 402 to 412 are repeated. All light sensors are scanned if the values of signals are lower than the predetermined value in step 416.

The scanning method for determining a touch position of a touch input apparatus of the invention includes full scan and partial scan portions performed via firmware programming of the control module. Since the detection of the touch point of the conventional method is performed via scanning all sensors to detect the variation of light sensing signals, the response speed is limited to the number of the sensors. Contrary to the conventional method, the invention locates the light sensors generating signals with maximum values in the full scan portion and performs the partial scan portion according to the locations of the light sensors generating signals with maximum values. The partial scan portion is performed on a region encompassing the light sensor generating signals with maximum values and its adjacent sensors such as three light sensors adjacent the light sensor generating signals with maximum values. The partial scan portion detects the locations of the light sensors generating signals with maximum values relative to the pointer when the pointer moves. Since only the locations of the light sensors adjacent the light sensors generating signals with maximum values are need to be refreshed, the response speed of the touch input apparatus can be upgraded.

Although specific embodiments have been illustrated and described, it will be appreciated by those skilled in the art that various modifications may be made without departing from the scope of the present invention, which is intended to be limited solely by the appended claims.

What is claimed is:

1. A scanning method for determining a touch position of a pointer on a touch input apparatus, said method comprising:
  (a) providing a touch input apparatus with at least one light emitting device and at least one light receiving device having a plurality of light sensors;
  (b) performing a first exposure process on the light receiving device by the light emitting device;
  (c) scanning the light sensors of the light receiving device;
  (d) locating a light sensor generating a signal with a maximum value;
  (e) determining a region of partial scan of the light sensors according to the position of the light sensor generating the signal with the maximum value;
  (f) performing a second exposure process on the light receiving device by the light emitting device;
  (g) scanning the light sensors within the region of partial scan;

(h) locating a light sensor generating a signal with a maximum value within the region of partial scan and determining a next region of partial scan;
(i) calculating the maximum value of the signal; and
(j) comparing the maximum value of the signal to a predetermined value to determine whether the maximum value is higher than the predetermined value.

2. The method according to claim 1, wherein the touch input apparatus comprises a touch panel.

3. The method according to claim 1, wherein the touch input apparatus comprises an electronic white board.

4. The method according to claim 1, wherein the light emitting device comprises an infrared laser emitting device.

5. The method according to claim 1, wherein the light sensors of the light receiving device are scanned sequentially in step (c).

6. The method according to claim 1, wherein a sensing area of the touch input apparatus is divided in to multiple divisions and the light sensors of the light receiving device are scanned by scanning one representative light sensor of the light sensors within each division in step (c).

7. The method according to claim 1, wherein the light sensors of the light receiving device are scanned by alternating scans in step (c).

8. The method according to claim 1 further comprising a step of calculating the coordinates of the pointer if the maximum value of the signal is higher than the predetermined value.

9. The method according to claim 1, wherein the steps (f)~(j) are repeatedly performed if the maximum value of the signal is higher than the predetermined value.

10. The method according to claim 1 further comprising a step of scanning all light sensors if the maximum value of the signal is lower than the predetermined value.

* * * * *